United States Patent [19]

Ray

[11] Patent Number: 4,774,210
[45] Date of Patent: Sep. 27, 1988

[54] DENSIFICATION AID FOR ALUMINUM BORATE PRODUCTS

[75] Inventor: Siba P. Ray, Plum Boro, Pa.

[73] Assignee: Aluminum Company of America, Pittsburgh, Pa.

[21] Appl. No.: 935,791

[22] Filed: Nov. 28, 1986

Related U.S. Application Data

[63] Continuation-in-part of Ser. No. 604,913, Apr. 27, 1984, abandoned.

[51] Int. Cl.$^4$ .............................................. C04B 35/10
[52] U.S. Cl. ..................... 501/127; 501/119; 501/125; 501/128; 501/153
[58] Field of Search ............... 501/119, 125, 127, 128, 501/153

[56] References Cited

U.S. PATENT DOCUMENTS

| | | | |
|---|---|---|---|
| 2,118,143 | 5/1938 | Benner et al. | 106/9 |
| 3,080,242 | 3/1963 | Berry | 106/65 |
| 3,350,166 | 10/1967 | Alley et al. | 23/59 |
| 3,503,765 | 3/1970 | Blaze | 106/65 |
| 3,795,524 | 3/1971 | Sowman | 106/65 |
| 4,510,253 | 4/1985 | Felice et al. | 501/95 |
| 4,540,475 | 9/1985 | De Angelis | 204/67 |

FOREIGN PATENT DOCUMENTS 2561945 10/1985 France .

Primary Examiner—Mark L. Bell
Attorney, Agent, or Firm—Andrew Alexander; John P. Taylor

[57] ABSTRACT

Provided is a sintering air suitable for use in forming aluminum borate into a ceramic product, the sintering aid comprised of an aluminum borate compound having a melting point lower than the sintering temperature of aluminum borate.

15 Claims, 3 Drawing Sheets

S# 578940-8
Major Alpha Al2O3
Major 2Al2O3.B2O3 Type Phase
Calcined at 800 C

S# 578940-9
Major Alpha Al2O3
Major 2Al2O3.B2O3 Type Phase
Calcined at 900 C

S# 5789-40-10
Major Alpha Al2O3
Major 2Al2O3.B2O3 Type Phase
Calcined at 1000 C

S# 578940-12
Major Al18B4O33
Minor Alpha Al2O3
Calcined at 1150 C

S# 578914
Major Al18B4O33
Minor Alpha Al2O3
13000 deg.C

DENSIFICATION AID FOR ALUMINUM BORATE PRODUCTS

CROSS-REFERENCE TO RELATED APPLICATIONS

This application is a continuation-in-part of Ray U.S. patent application Ser. No. 604,913 filed Apr. 27, 1984 abandoned.

BACKGROUND OF THE INVENTION

1. Field of the Invention

This invention relates to a light weight shaped opaque aluminum borate product. More particularly, this invention relates to a high strength, light weight, shaped opaque aluminum borate product formed by reacting an aluminum oxide and a boron oxide and a method of making the aluminum borate material using an improved sintering aid.

2. Description of the Related Art

Lightweight ceramic materials formed from aluminum oxide mixed with phases of other metal oxides are desirable from the standpoint of weight as well as chemical inertness. In Ray U.S. patent application Ser. No. 604,913, there is described and claimed a ceramic which comprises an interwoven mixture of $TiB_2$ and $Al_2O_3$ formed by reacting together a mixture of $TiO_2$, $B_2O_3$ and aluminum metal. This ceramic material has been found to possess excellent electrical conductivity and chemical inertness properties even at elevated temperatures, making it an excellent material for use as an electrode in an electrolytic reduction cell at elevated temperatures.

However, such ceramic materials or cermets are not necessarily characterized by light weight nor do they always possess high strength qualities, particularly if they have been blended to optimize other properties such as chemical inertness and electrical conductivity.

The formulation of ceramic materials from oxides of aluminum and boron would be expected to be somewhat lighter than aluminum oxide, depending upon the amount of boron oxide used, since the density of aluminum oxide is about 3.9 and the density of boron oxide is about 2.46. Ceramics made from such oxides are known.

Sowman U.S. Pat. No. 3,795,524 describes the formation of transparent extrusions such as fibers of aluminum borate and aluminum borosilicate materials from an aqueous solution or dispersion, e.g., an aqueous solution of a boric acid-stabilized aluminum acetate, which is concentrated into extrudable gels, subsequently dried, and then fired at temperatures up to 1000° C. to form fibers of transparent aluminum borate or aluminum borosilicate. The patentee states that low density aluminum borate fibers may be formed in this manner having an $Al_2O_3:B_2O_3$ mole ratio of from 9:2 to 3:1.5. Sowman, however, cautions against firing at temperatures as high as 1200° C., stating that fibers fired at this temperature are weak and fragile.

DeAngelis U.S. Pat. No. 4,540,475 discloses the formation of a multiple phase body containing phases of $TiB_2$, $Al_2O_3$ and $9Al_2O_3 2B_2O_3$ which was formed from a dry mixture of $AlB_2$, $TiO_2$ and $Al_2O_3$ which was pressed at 1500 psi and then fired at 1500° C.

Baumann and Moore in an article entitled "Electric Furnace Boroaluminate" in *The Journal of the American Ceramic Society*, Oct. 1, 1942, Vol. 25, No. 14, disclose that boroaluminate has been produced as a crystalline material by electric furnace fusion. The crystal form is orthorhombic, and it appears to melt incongruently and is analogous in several ways to mullite.

SUMMARY OF THE INVENTION

It has now been discovered that a moderately high strength, low density, shaped opaque aluminum borate ceramic product may be formed.

It is, therefore, an object of this invention to provide a high strength, low density shaped opaque aluminum borate ceramic product.

It is another object of this invention to provide a high strength, low density shaped opaque aluminum borate product having an MOR of at least 42,000 psi and a surprisingly low density of about 2.9 grams/cm³.

It is yet another object of this invention to provide a high strength, low density shaped opaque aluminum borate product formed by reacting together a mixture of an aluminum oxide and a boron oxide, for example.

It is a further object of this invention to provide a method for making a high strength, low density shaped opaque aluminum borate ceramic product which comprises reacting together a mixture preferably of an aluminum oxide and boron oxide at a temperature of from 900° to 1400° C., particularizing the reacted mixture, and then sintering the particulate at a temperature of from about 1300° to 1400° C. while maintaining a pressure of 2500 to 3500 psi on the particulate during the sintering.

The aluminum borate ceramic product formed can have a composition substantially $Al_xB_yO_z$ wherein y is in the range of 16 to 22, y is in the range of 2 to 5 and z is in the range of 30 to 36, and the composition can be formed by reacting an aluminum compound and a boron compound, at least one of the compounds containing oxygen.

These and other objects of the invention will be apparent from the following description and accompanying flow sheet.

DETAILED DESCRIPTION OF THE INVENTION

Figure 1:
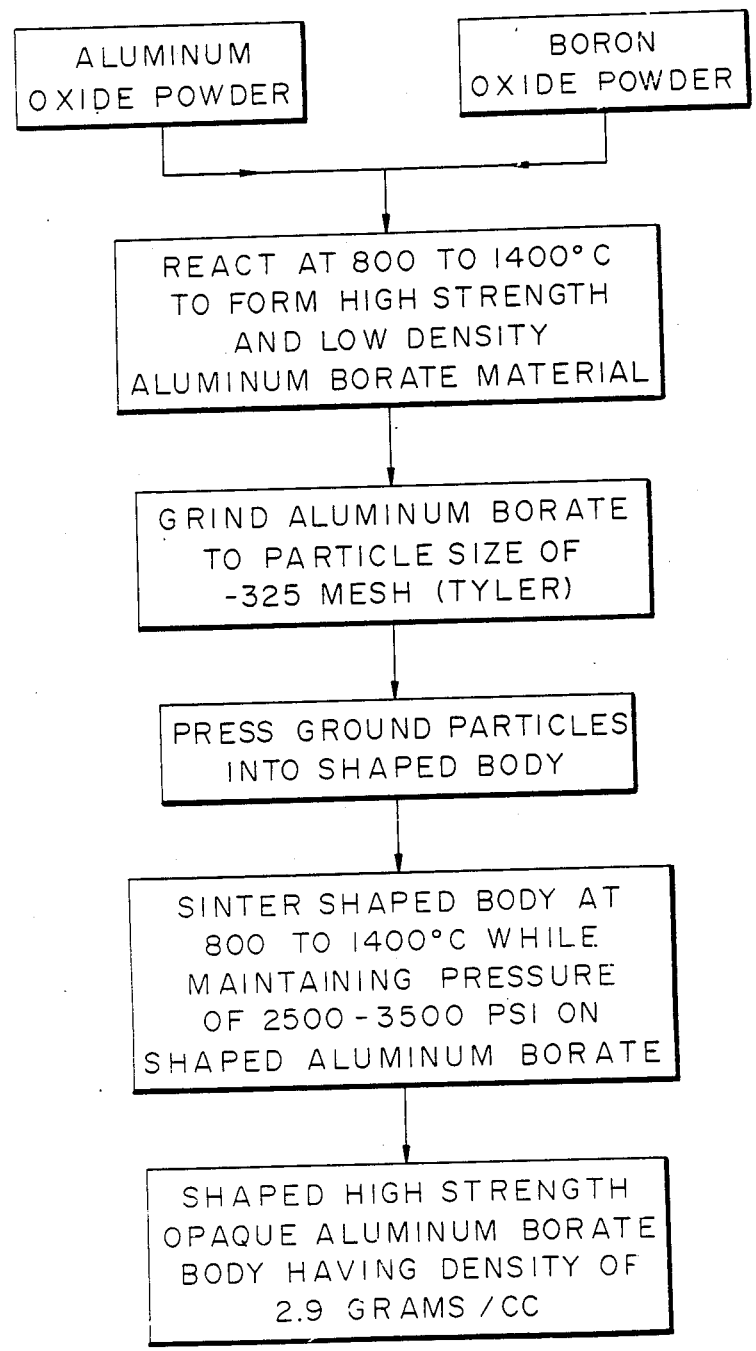
FIG. 1 is a flow sheet illustrating the process of the invention.

The high strength and low density shaped opaque aluminum borate ceramic product of the invention may be characterized by the formula $Al_xB_yO_z$ wherein x=16 to 22, y=2 to 5 and z=30 to 36. Preferably, the high strength and low density aluminum borate material of the invention comprises, in one aspect of the invention, stoichiometry represented by the formula $Al_{18}B_4O_{33}$.

The high strength, low density aluminum borate may be formed by initially mixing together a powder mixture of finely ground aluminum oxide and boron oxide. The aluminum oxide powder may comprise Alcoa A-16 super ground alumina having an average particle size of 0.4 micrometer while the boron oxide may comprise Fisher A-76 $B_2O_3$ powder or boria powder which should have an average particle size of about −325 mesh (Tyler). The powder mixture may then be heated at from 900° to 1400° C. for a period of from 5 minutes to 2 days to form a fiber product, for example. Optionally, the powder mixture may be first pressed into a green ceramic and then heated.

Other aluminum compounds, e.g., $Al_2O_3.3H_2O$, $Al_2O_3.H_2O$, $AlCl_3.6H_2O$, $AlCl_3$, and $Al(NO_3)_3.9H_2O$, may be used along with boric acid, e.g., $H_3BO_3$, to produce the material, e.g. powder or fibers, for forming into the ceramic product.

In either embodiment, the heated material may be particularized such as by grinding or the like to a powder size of −325 mesh (Tyler), e.g., 0.4 to 30 micrometers, and typically an average particle size of 0.6 to 1.0 micrometer and then pressed into the desired shape and sintered at a temperature of from about 1300° to 1400° C. for a period of from about 5 minutes to 2 hours while maintaining the ceramic under a pressure of about 2500 to 3500 psi using a non-reactive die surface such as a graphite surface.

The resulting shaped aluminum borate product comprises a high strength, low density gray opaque material having an MOR of approximately 47,000 psi, a hardness of 1300 VPN and a density of 2.92 grams per cubic centimeter ($g/cm^3$).

While the inventor does not wish to be bound by any theory of why the resulting aluminum borate material possesses such strength while exhibiting such a low density, it appears that the aluminum oxide and boron oxide are reacting together to form a crystal structure less dense, i.e., more open, then that of the aluminum oxide. Thus even though the less dense boron oxide material is only present in an aluminum oxide/boron oxide molar ratio of 9:2, the reduction of the density of the aluminum borate product from that of aluminum oxide is, surprisingly, a drop of from 3.9 down to 2.9. That is, since the molar percentage of the aluminum oxide is 82% (87 wt. %) in the aluminum borate composition and that of the boron oxide only 22% (13 wt. %), one would not expect such a drastic reduction in density in the final product from that of the predominantly aluminum oxide component absent a change in the crystallography of the resultant product. Furthermore, it must be noted that the resulting product, apparently due to the pressure used in forming the product, has a density which is almost 99% of theoretical, i.e., there is very little porosity in the final product.

Aluminum borate materials formed in accordance with the invention may be used as wear and abrasive surfaces for dies for drawing, forming, or extrusion; finishing operations such as cutting tools and machining tools; surface coatings such as, for example, marble-like floor coatings; adiabatic engine components; and protective cladding. The aluminum borate materials of the invention may also find utility in combination with other materials such as dispersion strengthened metals and structural composites of metal and ceramic matrices.

The aluminum borate material of the invention may also be blended with up to 95 vol. %, typically 25 to 50 vol. % of other materials to obtain composites with other properties. For example, the aluminum borate may be mixed with $TiB_2$ or $ZrB_2$ to obtain a composite product, if desired, while retaining the high strength properties of the aluminum borate. $Al_2O_3$ and other metal oxides, borides, carbides and/or nitrides may also be blended with the aluminum borate. To provide a material with enhanced toughness, from 5 to 30 vol. % of a mixture of $ZrO_2$—$Y_2O_3$ or $HfO_2$—$Y_2O_3$ may be added to the aluminum borate. Preferably such materials are added to the powdered mixture of aluminum borate prior to the pressurized sintering step.

The pressure may be dispensed with during the sintering step if it is desired to produce a more porous product. For example, an aluminum borate having a porosity of 20% may be produced by sintering the particulate in an open furnace without restraining the sintered mass. A porous aluminum borate and titanium or zirconium boride mixture may also be obtained by reaction sintering a mixture of titanium or zirconium oxide with boria, alumina and aluminum in accordance with one of the following formulas:

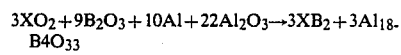

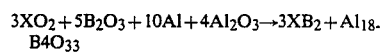

Wherein X = titanium or zirconium

Such a porous material could be further modified by impregnating the pores of the ceramic material with a metal such as aluminum or steel to produce a cermet with enhanced properties.

Figure 2A:
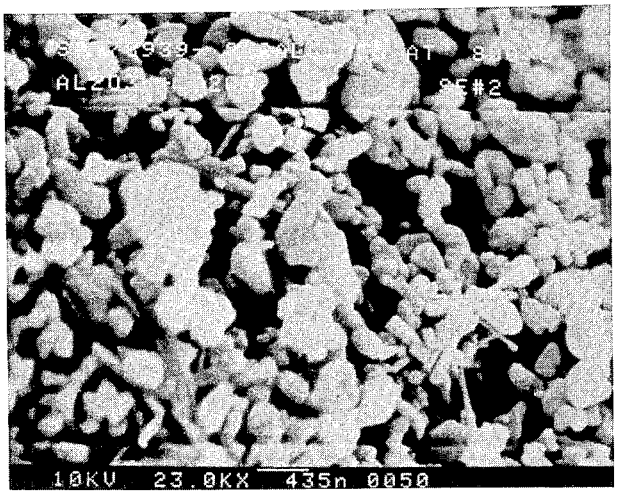
FIGS. 2a, 2b, 2c, 2d and 2e are series of micrographs showing the product formation in accordance with the invention at different temperatures.
Figure 2B:
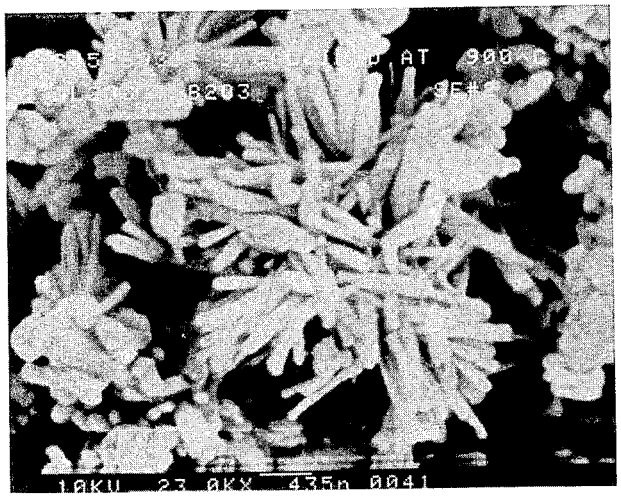
Figure 2C:
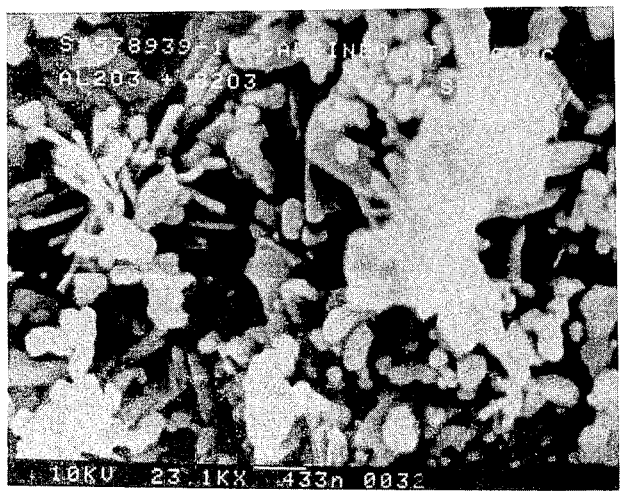

A mixture of powder containing 86.83 wt. % alumina A-16-SG and 13.17 wt. % boron oxide were mixed and calcined at 800° C. The materials resulting from the calcination are shown in FIG. 2a. This material was then heated further to 900° C. and is shown in FIG. 2b. It will be noted that after treating to 900° C., some of the particles are needle shaped. The same was true when the material was further treated to 1000° C.

Figure 2D:
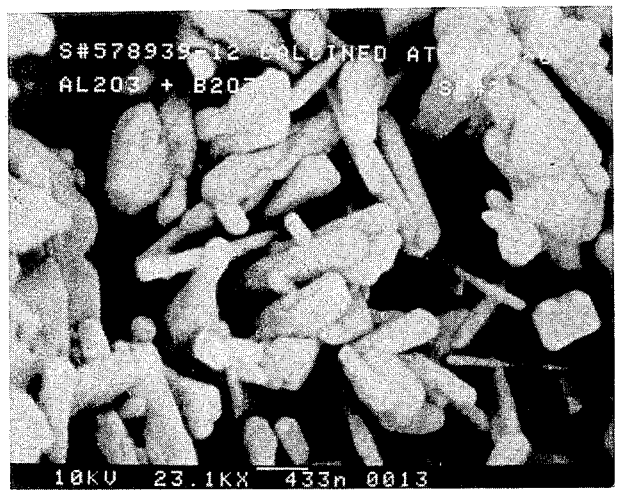
Figure 2E:
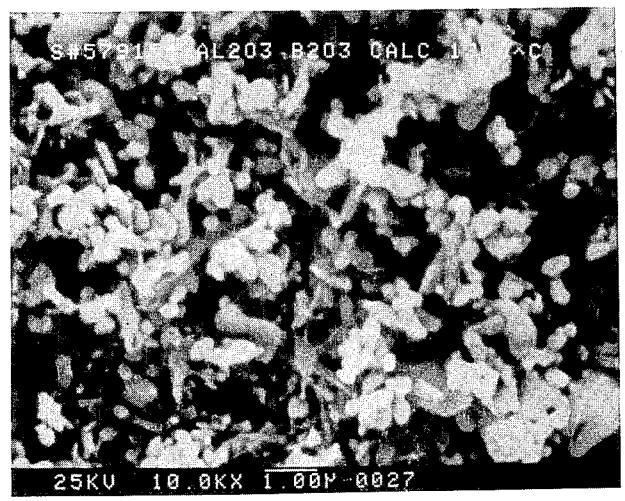

On heating up to 1000° C., it will be noted that the major constituents are $Al_2O_3$ and $2Al_2O_3.B_2O_3$ type phase. On further heating to 1150° C., that there was a major phase change; that is, the major constituent form was $Al_{18}B_4O_{33}$ and the minor was $Al_2O_3$ (FIG. 2d). The material was further heated to 1300° C. and is shown in FIG. 2e. It will be seen that calcination of alumina and boria powder at a temperature of about 1150° C. resulted in the formation of $Al_{18}B_4O_{33}$.

The $Al_{18}B_4O_{33}$ material was ground to a particle size in the range of 0.5 to 10 micrometers and subsequently hot pressed at 1350° C. in a graphite mold to provide a density of 2.92 gm/cc (99% dense). The ceramic material formed had a thermal expansion coefficient $(3.9 \times 10^{-6}$ cm/cm/°K.), and thermal conductivity of 0.065 W/cm/K. In addition, the material had a MOR strength of 47,000 psi, a hardness of 1300 VPN and an elastic modulus of $31.8 \times 10^6$ psi.

In another aspect of the invention, it has been discovered that a lightweighted aluminum borate type ceramic material can be fabricated without pressure being used during sintering and a low porosity, e.g., a density of 2.7 gm/cc, can be obtained. Typically, the theoretical green density of a boria-alumina powder mix (86.8 wt. % alumina, 13.2 wt. % boria) is approximately 3.35 g/cc. On sintering to form $Al_{18}B_4O_{33}$, the theoretical density is about 2.93 g/cc. Cold pressing at 15,000 to 40,000 psi and then sintering temperature of 1400° for 2 hours provides a density of 1.95 g/cc. This shows very poor densification. Substantially all of the mix is converted to an $Al_{18}B_4O_{33}$ ceramic product. However, it is highly advantageous if low density, pore-free $Al_{18}B_4O_{33}$ type ceramic material can be obtained without pressure applied during sintering. Thus, in this aspect of the invention, it has been found that the addition of a calcium or magnesium compound, e.g., CaO or $MgCl_2$, provides this benefit. Thus, one mole each of CaO, $B_2O_3$ and $Al_2O_3$ were heated to 1098° C. to provide $CaAl_2B_2O_7$ having a density of 2.5 g/cc. The calcium aluminum borate sintering aid can have the formula $Ca_tAl_uB_vO_w$ wherein t is in the range of 0.8 to 1.2, u is in the range of 1.5 to 2.5, v is in the range of 1.0 to 2.5 and w is in the range of 6 to 8. It will be appreciated that elements like magnesium may be substituted for calcium in the formula to serve as a sintering aid. Preferably, t is in the range of 0.9 to 1.1, u is in the range of 1.7 to 2.2, v is in the range of 1.7 to 2.5, w is in the range of 6.7 to 7.5. This material acts as a (transient) liquid phase sintering or densifying aid for $Al_{18}B_4O_{33}$ type materials. For example, it was found that the addition of 4 wt. % $CaAl_2B_4O_7$ to $Al_{18}B_4O_{33}$ calcined and ground powder provided 93% dense material at a density of 2.7 gm/cc after cold pressing and then sintering at 1350° C. The $CaAl_2B_4O_7$ sintering aid can range from 0.25 to about 10 wt. %.

By liquid aluminum borate sintering aid is meant a sintering or densifying aid of an aluminum borate compound which at a sintering temperature, e.g., 1200° to 1500° C., the sintering aid melts or forms a liquid, thus aiding densification by permitting enhanced diffusion through the liquid phase. Further, by the use of aluminum borate, is meant to include compounds containing aluminum, boron and oxygen. For example, the use of aluminum borate includes aluminum borate compounds such as calcium aluminum borate, magnesium aluminum borate, aluminum borosilicate and aluminum borophosphate.

Thus the shaped aluminum borate product of the invention comprises a high strength and low density material which may be produced in a variety of formed shapes. The product may be used by itself or as a valuable precursor for use in connection with other materials to achieve a variety of desired physical properties.

Having thus described the invention, what is claimed is:

1. A shaped high strength sintered aluminum borate ceramic product having improved density and consisting essentially of a mixture of:
   (a) $Al_xB_yO_z$ wherein x is in the range of 16 to 22, y is in the range of 2 to 5, and z is in the range of 30 to 36; and
   (b) a sintering aid consisting of an aluminum borate compound having a melting point lower than the sintering temperature of said $Al_xB_yO_z$;
   and formed by particularizing said mixture to a particulate having an average particle size of −325 mesh (Tyler); pressing said particulate into a shaped product; and sintering said shaped product into a shaped high strength sintered aluminum borate ceramic product at a temperature above the melting point of said sintering aid, wherein the presence of said sintering aid results in an improvement in the density of said sintered aluminum borate ceramic product.

2. The shaped high strength high density aluminum borate ceramic product in accordance with claim 1 wherein the aluminum borate sintering aid consists essentially of a calcium aluminum borate having the formula $Ca_tAl_uB_vO_w$ wherein t is in the range of 0.8 to 1.2, u is in the range of 1.5 to 2.5, v is in the range of 1.0 to 2.5, and w is in the range of 6 to 8.

3. The shaped high strength high density aluminum borate ceramic product in accordance with claim 2 wherein t is in the range of 0.9 to 1.1, u is in the range of 1.7 to 2.2, v is in the range of 1.7 to 2.5 and w is in the range of 6.5 to 7.5.

4. The shaped high strength high density aluminum borate ceramic product in accordance with claim 1 wherein the compound is calcium aluminum borate.

5. The shaped high strength high density aluminum borate ceramic product in accordance with claim 1 wherein the compound is magnesium aluminum borate.

6. The shaped high strength high density aluminum borate ceramic product in accordance with claim 1 wherein the compound is aluminum borophosphate.

7. The shaped high strength high density aluminum borate ceramic product in accordance with claim 1 wherein the compound is aluminum borosilicate.

8. The shaped high strength high density aluminum borate ceramic product in accordance with claim 1 wherein the sintering aid is liquid at sintering temperatures.

9. The shaped high strength high density aluminum borate ceramic product in accordance with claims 4, 5, 6 or 7 wherein said sintering aid is present in the amount of 0.25 to 10 wt. %.

10. An aluminum borate opaque ceramic product formed from a composition substantially $Al_xB_yO_z$ wherein x is in the range of 16 to 22, y is in the range of 2 to 5 and z is in the range of 30 to 36, the composition formed by reacting an aluminum compound and a boron compound, at least one of the compounds containing oxygen, the ceramic product formed by sintering said composition with a sintering aid selected from calcium aluminum borate, magnesium aluminum borate, aluminum borophosphate and aluminum borosilicate.

11. The ceramic product in accordance with claim 12 wherein the aluminum compound is selected from $Al_2O_3$, $AlCl_3$, $Al_2O_3.3H_2O$, $Al_2O_3.H_2O$, $AlCl_3.6H_2O$, and $Al(NO_3)_3.9H_2O$.

12. The ceramic product in accordance with claim 10 wherein the boron compound is boron oxide.

13. The ceramic product in accordance with claim 10 wherein the aluminum compound is alumina.

14. A shaped high strength sintered aluminum borate ceramic product having improved density and consisting essentially of a mixture of:
   (a) $Al_{18}B_4O_{33}$; and
   (b) from 0.5 to 7 wt. % of a sintering aid consisting of an aluminum borate compound selected from the class consisting of calcium aluminum borate, magnesium borate, aluminum borosilicate, and aluminum borophosphate, and being liquid at a temperature for sintering said $Al_{18}B_4O_{33}$ into said ceramic product;
   and formed by particularizing said mixture to a particulate having an average particle size of −325 mesh (Tyler); pressing said particulate into a shaped product; and sintering said shaped product at a temperature of from about 1200° to 1500° C. into a shaped high strength sintered aluminum borate ceramic product, wherein said sintering aid improves the density of said sintered aluminum borate ceramic product.

15. The high density shaped high strength sintered aluminum borate ceramic product of claim 14 wherein said product is sintered at a temperature of from about 1300° to 1400° C.

* * * * *